United States Patent
Kato et al.

(10) Patent No.: US 8,437,439 B2
(45) Date of Patent: May 7, 2013

(54) SIGNAL PROCESSING APPARATUS, SIGNAL TRANSMITTING SYSTEM, AND SIGNAL PROCESSING METHOD

(75) Inventors: Shuichi Kato, Akiruno (JP); Susumu Kawata, Hachioji (JP); Makoto Honda, Odawara (JP)

(73) Assignees: Olympus Corporation, Tokyo (JP); Olympus Medical Systems Corp., Tokyo (JP)

( * ) Notice: Subject to any disclaimer, the term of this patent is extended or adjusted under 35 U.S.C. 154(b) by 1176 days.

(21) Appl. No.: 12/257,602

(22) Filed: Oct. 24, 2008

(65) Prior Publication Data

US 2009/0110111 A1    Apr. 30, 2009

(30) Foreign Application Priority Data

Oct. 26, 2007 (JP) .................................. 2007-279219

(51) Int. Cl.
*H04L 7/02* (2006.01)

(52) U.S. Cl.
USPC ........... 375/361; 375/295; 375/316; 375/354; 375/355; 375/359

(58) Field of Classification Search .................. 375/135, 375/136, 242, 316, 324, 342, 354, 359, 361
See application file for complete search history.

(56) References Cited

U.S. PATENT DOCUMENTS

| | | | |
|---|---|---|---|
| 6,885,716 B1 * | 4/2005 | Zalud et al. | 375/361 |
| 7,469,023 B2 * | 12/2008 | Vasana | 375/342 |
| 2002/0025041 A1 * | 2/2002 | Tomita | 380/256 |
| 2006/0165185 A1 * | 7/2006 | Dally et al. | 375/257 |
| 2006/0255156 A1 * | 11/2006 | Arisawa et al. | 235/492 |
| 2007/0195911 A1 * | 8/2007 | Ochi | 375/324 |
| 2009/0217137 A1 * | 8/2009 | Reid et al. | 714/776 |
| 2011/0093751 A1 * | 4/2011 | Boezen et al. | 714/727 |

FOREIGN PATENT DOCUMENTS

| | | |
|---|---|---|
| JP | 05-244171 A | 9/1993 |
| JP | 05-336093 A | 12/1993 |
| JP | 8-191269 A | 7/1996 |
| JP | 2001-53731 A | 2/2001 |
| JP | 2004-7082 A | 1/2004 |
| JP | 2004-511191 A | 4/2004 |
| JP | 2006-287052 A | 10/2006 |
| WO | 01/80444 A1 | 10/2001 |

OTHER PUBLICATIONS

Uenishi Masaru, Reception processing sytem, JP 05-336093, Dec. 17, 1993.*
Japanese Office Action dated Mar. 12, 2013, issued in corrersponding Japanese Patent Application No. 2007-279219, w/ partial English translation.

* cited by examiner

*Primary Examiner* — Hirdepal Singh
(74) *Attorney, Agent, or Firm* — Westerman, Hattori, Daniels & Adrian, LLP

(57) ABSTRACT

A signal processing apparatus, which executing a decoding process for a digital signal Manchester-encoded by assigning two bits of "10" to any one of binary digital signals "0 and "1", and assigning two bits of "01" to the other binary digital signal, is provide with a decoding unit which executes the decoding process with a processing unit corresponding to a term of two bits of the Manchester-encoded digital signal so as to detect only any one of the first bit and the second bit of the Manchester-encoded digital signal.

17 Claims, 6 Drawing Sheets

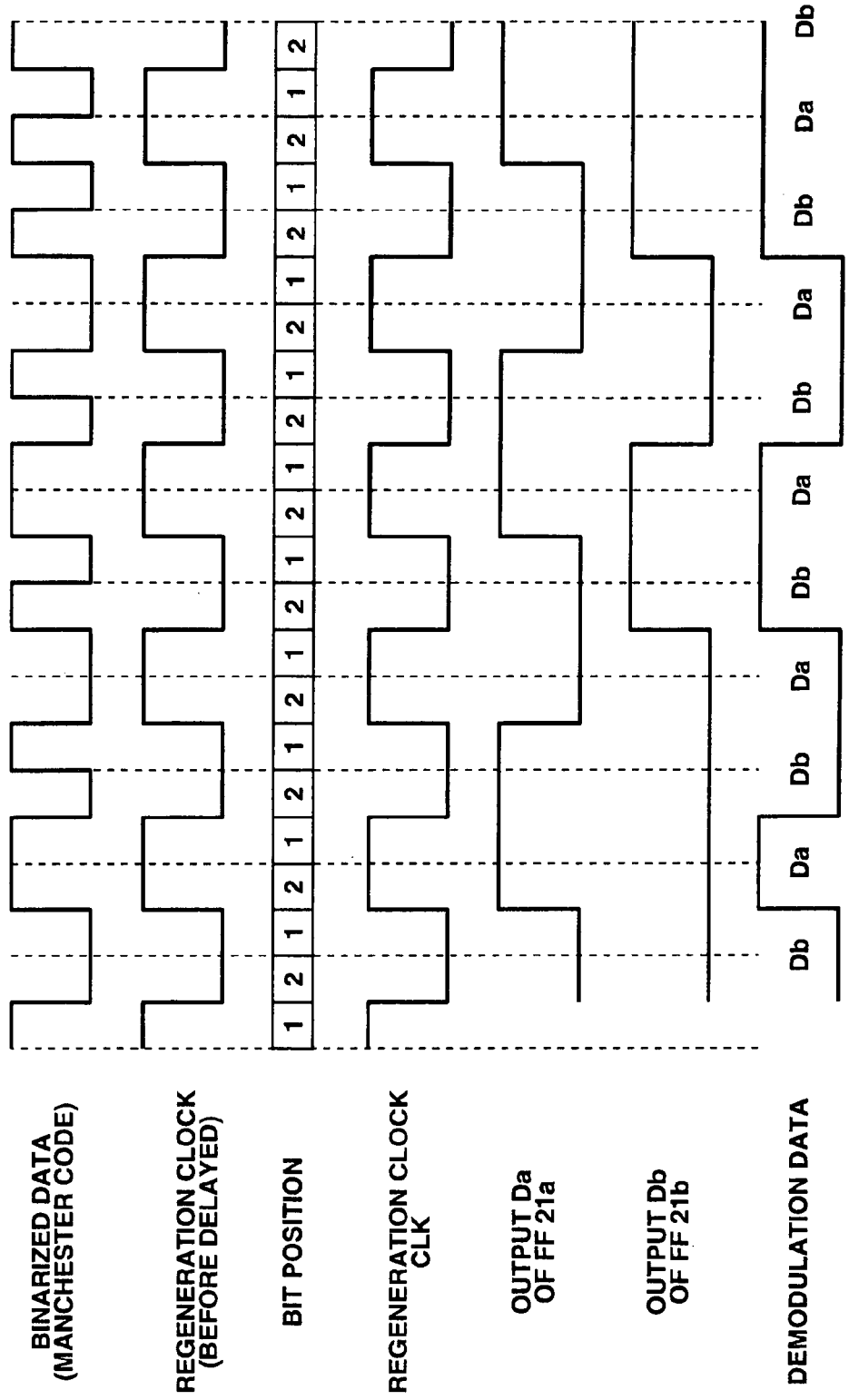

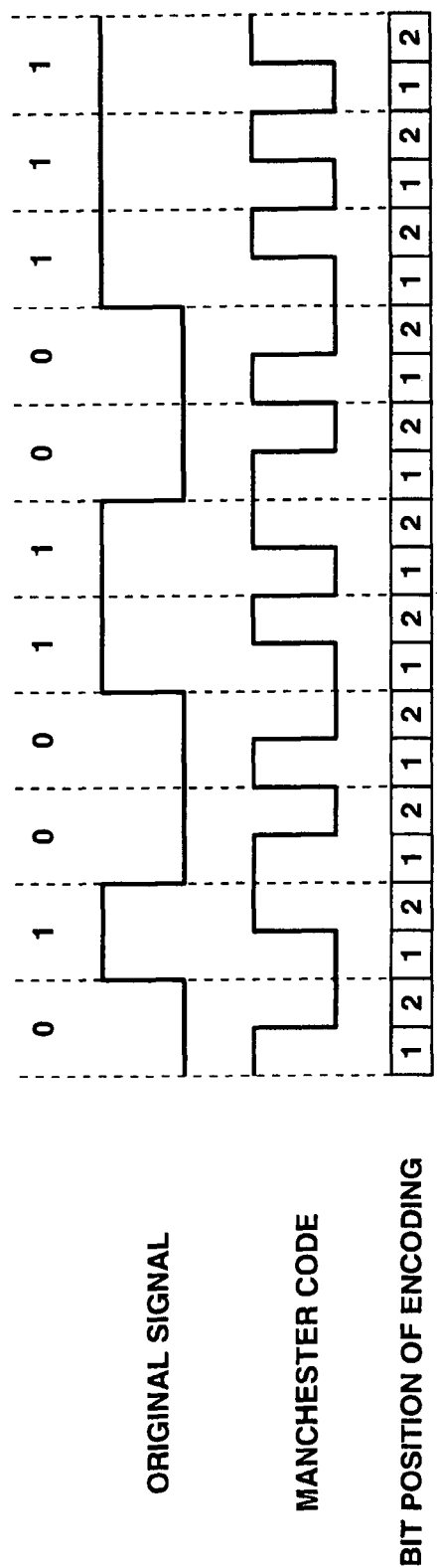

SIGNAL PROCESSING APPARATUS, SIGNAL TRANSMITTING SYSTEM, AND SIGNAL PROCESSING METHOD

CROSS REFERENCE TO RELATED APPLICATION

This application claims benefit of Japanese Application No. 2007-279219 filed on Oct. 26, 2007, the contents of which are incorporated by this reference.

BACKGROUND OF THE INVENTION

1. Field of the Invention

The present invention relates to a signal processing apparatus, a signal transmitting system, a signal processing method for executing the signal-processing for a Manchester-encoded digital signal.

2. Description of the Related Art

The Manchester-encoding is widely used as a modulating method for transmitting a digital signal at a high rate.

For example, when a digital signal is transmitted at a high rate, it is widely executed to separate, with a capacitive-coupling, DC levels of a transmitting unit and a receiving unit in a high rate transmitting line so as to absorb the influence of the DC levels between the transmitting unit and the receiving unit. When the DC levels are separated as described above, the Manchester code is adopted to maintain a DC balance between the transmitting unit and the receiving unit, in which the number of "H" (or, "1") signals and the number of "L" (or, "0") signals are equal to each other in a binary digital signal.

A method is known in which wide electrodes are capacitive-coupled by causing the electrodes sandwiching insulation material to face each other without contacting to each other, and a signal is transmitted by wireless, and in such a case, the Manchester code is used so that the signal can be also transmitted where a transmission rate is increased and a coupling capacity is small.

When the Manchester code is used as described above, as illustrated in FIG. 7, an original signal is encoded to the below-illustrated Manchester code by a Manchester-encoding circuit (or, a modulating circuit for the Manchester-encoding).

In the Manchester-encoding, the original signal is converted to a digital signal by assigning two bits of "10" to any one of the original signals "0 and "1", and two bits of "01" to the other original signal. Meanwhile, a term length of each of "10" and "01" is equal to a term of one bit of the original signal. Such a case is illustrated in FIG. 7 that "10" is assigned to the original signal "0", and "01" is assigned to the original signal "1".

FIG. 7 illustrates, below the Manchester code, a relation between the first bit and the second bit corresponding to the Manchester-encoding.

When such a Manchester code is decoded in the receiving side, as described above, since the Manchester code has been encoded to a signal whose term of one piece corresponds to a half term of the original signal, to a signal whose frequency is double of that of the original signal, when the decoding is processed at the frequency of the encoded signal, the power consumption increases.

For example, Japanese Patent Application Laid-Open Publication No. 8-191269 discloses an apparatus as a first prior example, in which the optical communication is executed by using the Manchester encoding and decoding.

In the apparatus, a transmitter Manchester-encodes data by using a clock, and transmits the encoded data as an optical signal. A receiver side generates a difference signal which is a difference between the received optical signal and a signal power a half bit before the received optical signal, and decodes (signal-reproduces) the difference signal by using a clock.

The clock is a clock whose frequency is the same as that of the clock of the transmitting side. One cycle of the clock corresponds to two bits of the Manchester-encoded signal, and a signal processing unit corresponds to a term of one bit of the Manchester-encoded signal.

Meanwhile, Japanese Patent Application Laid-Open Publication No. 2006-287052 discloses a capacitive-coupling apparatus as a second prior example, in which a signal can be transmitted even in such a structure that one side is rotated.

SUMMARY OF THE INVENTION

A signal processing apparatus of the present invention executing a decoding process for a digital signal which is Manchester-encoded by assigning two bits of "10" to any one of the binary digital signals "0 and "1", and two bits of "01" to the other binary digital signal is provided with a decoding unit for executing the decoding process, in which the term of two bits of the Manchester-encoded digital signal corresponds to the processing unit, so as to detect only any one of the first bit and the second bit of the Manchester-encoded digital signal.

A signal transmitting system of the present invention includes:
  a transmitting unit provided with a Manchester-encoding unit generating the Manchester-encoded digital signal by assigning two bits of "10" to any one of the binary digital signals "0 and "1" of transmission data to be transmitted, and two bits of "01" to the other binary digital signal; and
  a receiving unit provided with a decoding unit executing the decoding process, in which the term of two bits of the Manchester-encoded digital signal corresponds to the processing unit, so as to detect only any one of the first bit and the second bit of the Manchester-encoded digital signal.

A signal processing method of the present invention includes:
  a decoding step of executing the decoding process, in which the term of two bits of the Manchester-encoded digital signal corresponds to the processing unit, so as to detect only any one of the first bit and the second bit of the digital signal which is Manchester-encoded by assigning two bits of "10" to any one of the binary digital signals "0 and "1", and two bits of "01" to the other binary digital signal.

BRIEF DESCRIPTION OF THE DRAWINGS

FIG. 6 is a timing diagram illustrating an operation of a demodulating circuit according to the embodiment 2; and FIG. 7 is a description diagram when a signal is Manchester-encoded.

DETAILED DESCRIPTION OF THE PREFERRED EMBODIMENTS

Figure 1:
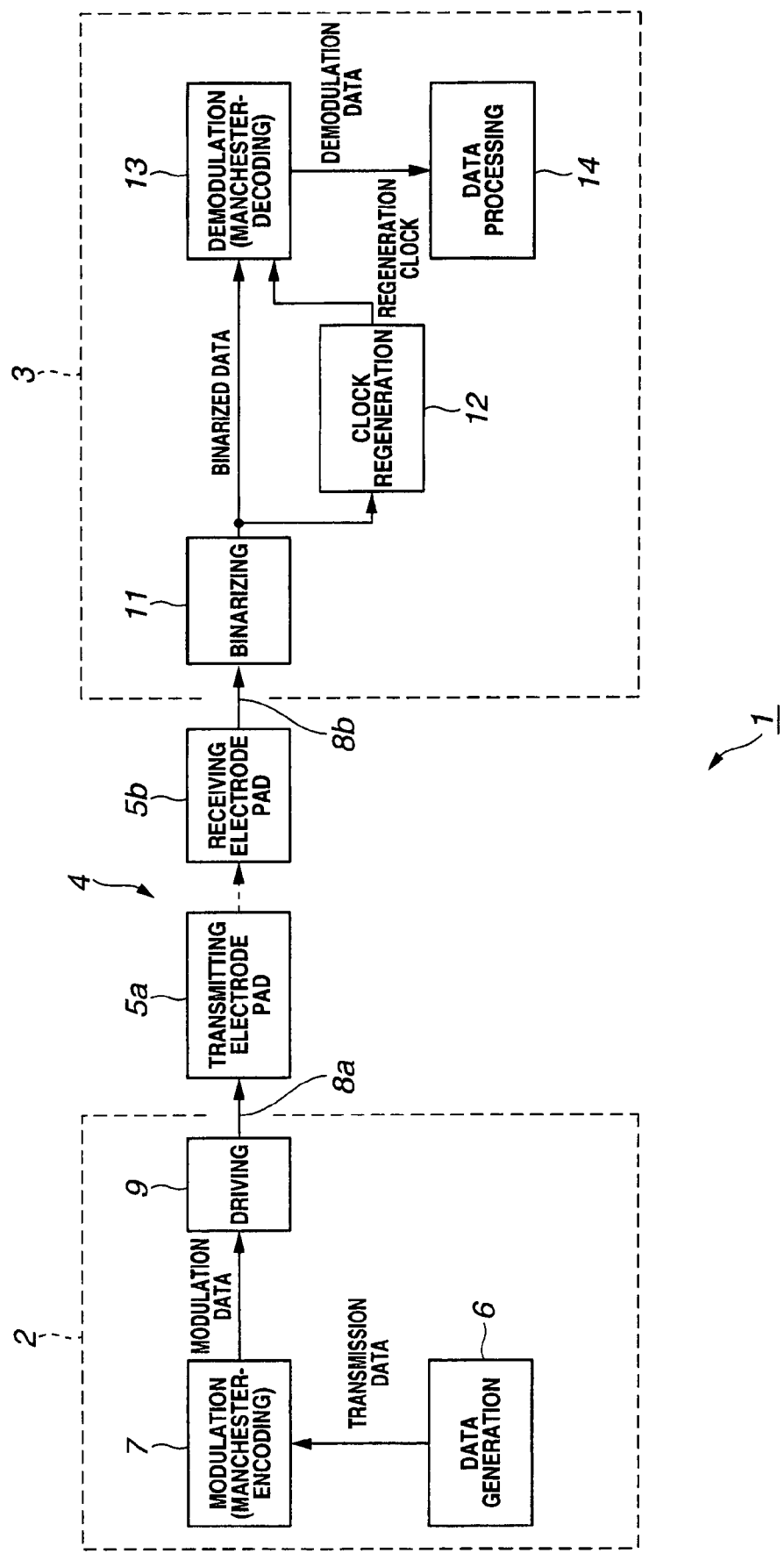
FIG. 1 is a block diagram illustrating a configuration of a signal transmitting system provided with an embodiment 1 of the present invention.

Embodiments of the present invention will be described below referring to the drawings.

Embodiment 1

Figure 2:
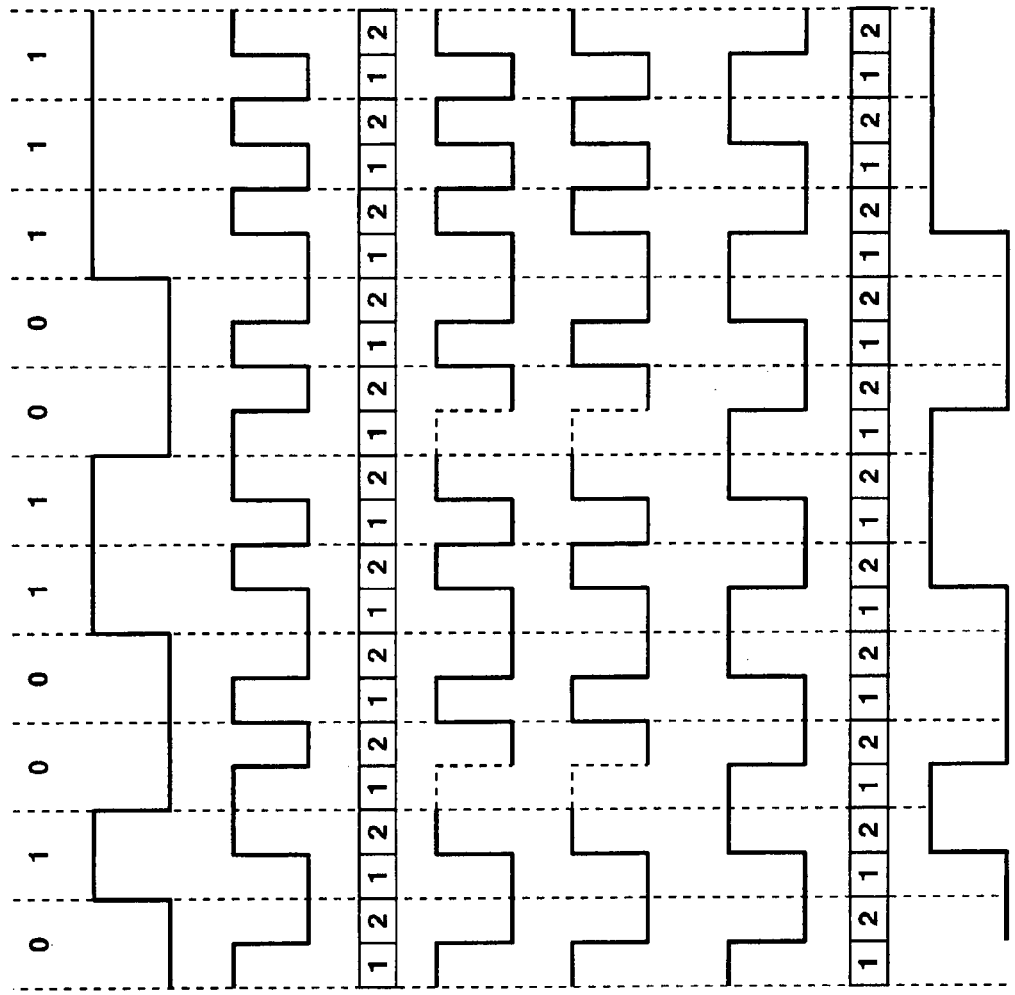
FIG. 2 is a timing diagram illustrating an operation for transmitting a signal.
Figure 3:
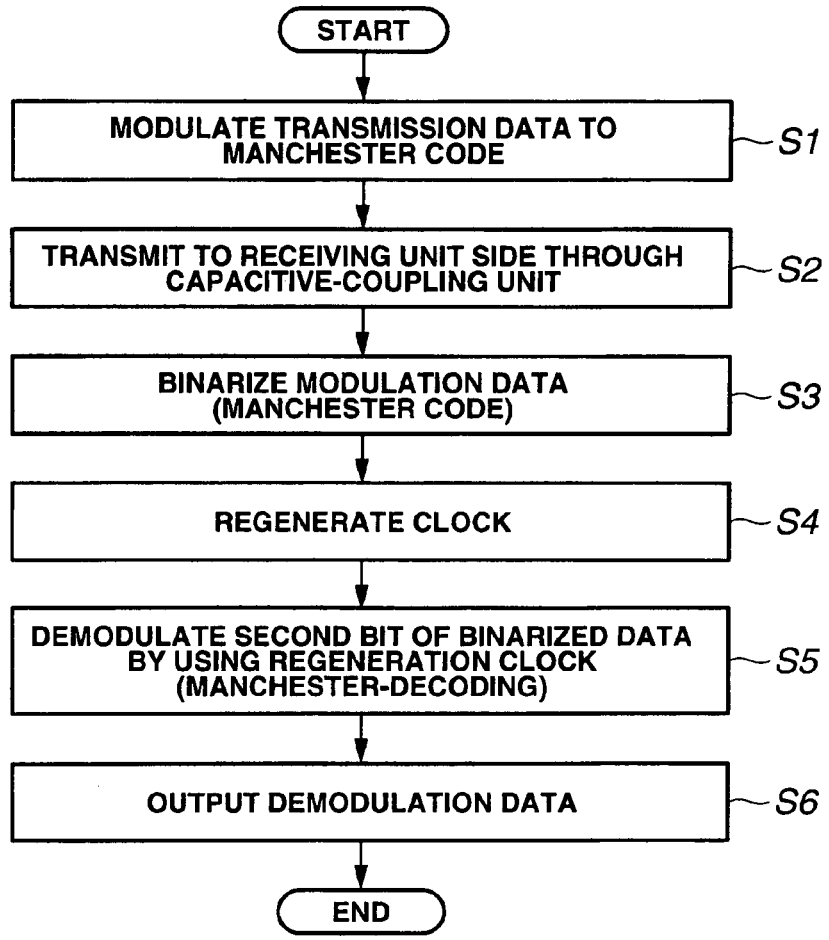
FIG. 3 is a flowchart for an operation content modulating data to the Manchester code, and demodulating the modulated data.
Figure 4:
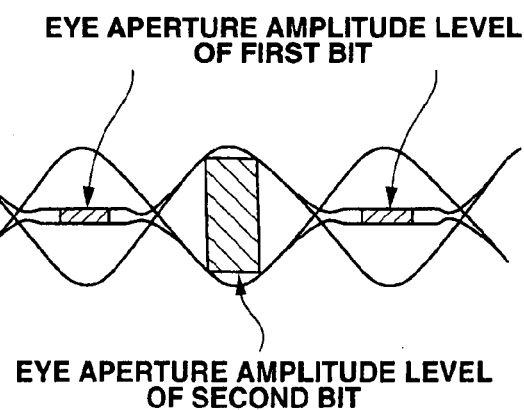
FIG. 4 is a diagram illustrating one example of the first and second bit eye patterns of the Manchester code when transmitting a Manchester-encoded signal through a capacitive-coupling unit.

FIG. 1 to FIG. 4 relate to an embodiment 1 of the present invention, and FIG. 1 is a block diagram illustrating a configuration of a signal transmitting system provided with the embodiment 1 of the present invention, FIG. 2 is a timing diagram illustrating an operation for transmitting a signal, FIG. 3 is a flowchart for an operation content modulating data to the Manchester code, and demodulating the modulated data, and FIG. 4 is a diagram illustrating one example of the first and second bit eye patterns of the Manchester code when transmitting the Manchester code through a capacitive-coupling unit.

A first object of the present embodiment is to provide a signal processing apparatus and a signal processing method in which the Manchester code transmitted through a capacitive-coupling unit can be demodulated at a low error rate, and with power consumption suppressed (that is, with power consumption reduced). A second object of the present embodiment is to provide the signal processing apparatus and the signal processing method in which the Manchester code can be demodulated with power consumption suppressed.

As illustrated in FIG. 1, a signal transmitting system 1 provided with the embodiment 1 of the present invention includes:
a transmitting unit 2 transmitting a signal;
a receiving unit 3 receiving the signal; and
a transmitting electrode pad 5a and a receiving electrode pad 5b configured in a capacitive-coupling unit 4 which is capacitive-coupling means face-to-face arranged to separate DC (direct current) components of a transmitting unit 2 side and a receiving unit 3 side to transmit the signal.

The transmitting unit 2 includes:
a data generating circuit 6 which is transmission data generating means for generating transmission data which is a binary digital signal to be transmitted;
a modulating circuit (Manchester-encoding circuit) 7 modulating the generated transmission data to the Manchester code; and
a driving circuit 9 current-amplifying and impedance-converting modulation data (that is, the Manchester code) modulated by the modulating circuit 7 and outputting the modulation data to a transmitting line 8a.

The modulation data, which is outputted to one terminal side of the transmitting line 8a through the driving circuit 9, is transmitted to a side of the receiving electrode pad 5b face-to-face arranged close to the transmitting electrode pad 5a through the transmitting electrode pad 5a provided in the other terminal side of the transmitting line 8a.

The modulation data, which is transmitted to the receiving electrode pad 5b, is transmitted to the other terminal side of a transmitting line 8b, in which the receiving electrode pad 5b is connected to one terminal side, and is inputted to a binarizing circuit 11 which is connected to the other terminal side, and is configured in the receiving unit 3 according to the embodiment 1 of the signal processing apparatus of the present invention.

The receiving unit 3 includes:
the binarizing circuit 11 executing the binarizing for forming the inputted modulation data; and
a clock regenerating circuit 12 regenerating a clock from binarized data binarized by the binarizing circuit 11.

The receiving unit 3 includes:
a demodulating circuit (that is, a Manchester-encoding circuit) 13 data-demodulating (or, data-decoding) from the binarized data by using a regeneration clock regenerated by the clock regenerating circuit 12; and
a data processing circuit 14 executing the data-processing for demodulation data demodulated (decoded) by the demodulating circuit 13.

As described above, in the Manchester code, which is the modulation data generated by the modulation of the modulating circuit 7 of the transmitting unit 2, signals "0" and "1" of the transmission data are encoded so that the first and the second bits become "10 and "01" (or, "HL" and "LH") respectively.

As described below, the receiving unit 3 according to the embodiment 1 detects only the second bit of the Manchester-encoded modulation data to decode the modulation data.

In such a case, the receiving unit 3 includes the demodulating circuit 13 which is demodulating means executing the decoding process for only the second bit of the modulation data which becomes the Manchester-encoded signal, that is, with the processing unit which corresponds to the term of two bits of the modulation data. As described above, the decoding process is executed for the Manchester-encoded signal with the processing unit corresponding to a signal processing cycle which is a half cycle of the Manchester-encoded signal, thereby, the power consumption is reduced.

In such a case, for the clock (herein, the regeneration clock) used for the decoding by the demodulating circuit 13, a term of two bits of the Manchester-encoded modulation data corresponds to the processing unit.

Specifically, a cycle of the regeneration clock is a term of four bits of the modulation data. Thus, it is possible to reduce the power consumption from the conventional example in which a term of one bit of the modulation data corresponds to the processing unit.

In the present embodiment, since the signal is transmitted through the capacitive-coupling, a transmission characteristic for the signal, whose frequency is close to the DC, is degraded in the capacitive-coupling unit 4, not the first bit, but only the second bit is detected for the Manchester-encoded modulation data.

Thereby, when the Manchester-encoded modulation data is signal-transmitted (data-transmitted) through the capacitive-coupling, and even when a frequency of the modulation data is low, for example, when the second bit and the first bit of the modulation data are continuous "11", it is possible to decode at a low error rate.

Generally, when the Manchester-encoded signal is transmitted through the capacitive-coupling, and when the second bit and the first bit of the signal are continuous "11", amplitude of the signal is decreased; therefore, such a problem is induced that an error rate is increased, or the signal recognizing becomes more difficult.

On the other hand, in the present embodiment, as described above, since not the first bit, but only the second bit of the Manchester-encoded modulation data is detected, such a problem is resolved. That is, the above first object is achieved. Meanwhile, the problem will be also described in the following FIG. 4.

Next, an operation of each unit of FIG. 1 will be described referring to the timing diagram of FIG. 2 and the flowchart of FIG. 3.

The data generating circuit 6 of the transmitting unit 2 illustrated in FIG. 1 generates, for example, the transmission data as illustrated in FIG. 2. The generated transmission data is inputted to the modulating circuit 7, and as illustrated at step S1 of FIG. 3, the modulating circuit 7 generates the Manchester-encoded modulation data from the transmission data.

An example of the generated modulation data will be illustrated in FIG. 2. In the Manchester-encoded modulation data, the transmission data, which is "0", is converted to "10", and the transmission data, which is "1", is converted to "01". Meanwhile, below the modulation data, the first bit and the second bit are illustrated when each transmission data is Manchester-encoded (to further clarify the operation content of the after-mentioned data demodulation).

The modulation data is transmitted to the receiving unit 3 side through the capacitive-coupling unit 4 as illustrated in step S2. The modulation data, which becomes an output of (the receiving electrode pad 5b of) the capacitive-coupling unit 4, will be illustrated in FIG. 2. In such a case, a signal level of the second half "1" of the continuous "11" part is lowered as illustrated by a dash line. Since a signal of the second half "1" appears only on the first bit of Manchester code, the eye pattern is illustrated in FIG. 4, which indicates a quality characteristic of the signal transmitted through the capacitive-coupling unit 4.

As described above, since a low frequency signal component is largely attenuated as compared with a high frequency signal component in the capacitive-coupling unit 4, in the case of the modulation data "11" whose frequency is low, the first bit at the second half signal position is largely attenuated.

Specifically, as illustrated in FIG. 4, an eye aperture amplitude level of the first bit is lowered. On the other hand, the eye aperture amplitude level of the second bit is sufficiently larger than that of the first bit. As described below, the receiving unit 3 generates the demodulation data, whose error rate is small, by executing the signal processing for the demodulation so as to detect only the second bit.

The modulation data inputted to the receiving unit 3 through the capacitive-coupling unit 4 is binarized by the binarizing circuit 11 as illustrated at step S3 of FIG. 3. The binarized data, which is the binarized modulation data, is illustrated in FIG. 2. Since amplitude of the dash line part of the binarized data is also lowered, the binarized data may be misrecognized.

The binarized data is inputted to the clock regenerating circuit 12. As illustrated at step S4, the clock regenerating process is executed, and as illustrated in FIG. 2, the regeneration clock is generated. In the regeneration clock illustrated in FIG. 2, two pieces of the binarized data correspond to a half cycle which is the processing unit for the decoding. The half cycle of the regeneration clock corresponds to one piece of the transmission data.

The clock regenerating circuit 12 is, for example, configured by using a phased locked loop (PLL) circuit, and can generate the regeneration clock, which is phase-synchronized with the binarized data, from the binarized data.

The regeneration clock is inputted to the demodulating circuit 13 along with the binarized data. By using the regeneration clock as illustrated at step S5, the demodulating circuit 13 demodulates the binarized data, in which two pieces of the binarized data correspond to the processing unit, so as to detect only the second bit, that is, the demodulating circuit 13 executes the Manchester-decoding process.

When the regeneration clock illustrated in FIG. 2 is used, the demodulating circuit 13 loads the second bit of the binarized data to, for example, a flip-flop circuit at a falling edge and a rising edge of the regeneration clock, and outputs the demodulated demodulation data (refer to FIG. 2) from the flip-flop circuit.

In such a case, the binarized data around a center of the second bit may be loaded (detected) by slightly delaying the regeneration clock with a delay element.

As illustrated at step S6 of FIG. 3, the demodulation data is outputted from the demodulating circuit 13. In FIG. 1, the outputted demodulation data is inputted to the data processing circuit 14, and the data processing circuit 14 executes the signal processing for the inputted demodulation data.

According to the receiving unit 3 with the above configuration and operation, since only the second bit is detected for the Manchester code, there is such an advantageous effect that the demodulation can be executed with an error rate of the misrecognition sufficiently reduced even when the signal is received through the capacitive-coupling unit 4.

In the present embodiment, since the demodulation is executed with the processing unit in which only the second bit of the Manchester code is detected, that is, with the processing unit which corresponds to two pieces of the Manchester code, as compared with the configuration in which the decoding is executed at a frequency in which the first bit and the second bit, that is, one piece of the Manchester code corresponds to the processing unit, it is possible to operate each unit configured in the receiving unit 3 at around a half of the above frequency; therefore, it is possible to reduce the power consumption of the receiving unit 3.

Particularly, in the demodulating circuit 13, while the inputted binarized data is substantially the same code as the Manchester code, the demodulating circuit 13 demodulates the inputted binarized data as synchronized with the regeneration clock whose frequency is low, thereby there is such an advantageous effect that the power consumption can be reduced.

Meanwhile, in an electronic device (circuit part) such as a semiconductor device and an integrated circuit device used for each circuit such as the clock regenerating circuit 12 configured in the receiving unit 3, it is unavoidable that a capacity is included between the electronic device and the ground; therefore, as the frequency becomes higher, the loss at the capacity part becomes larger. Thus, it is possible to reduce the power consumption by lowering an operational frequency like the present embodiment.

Embodiment 2

Figure 5:
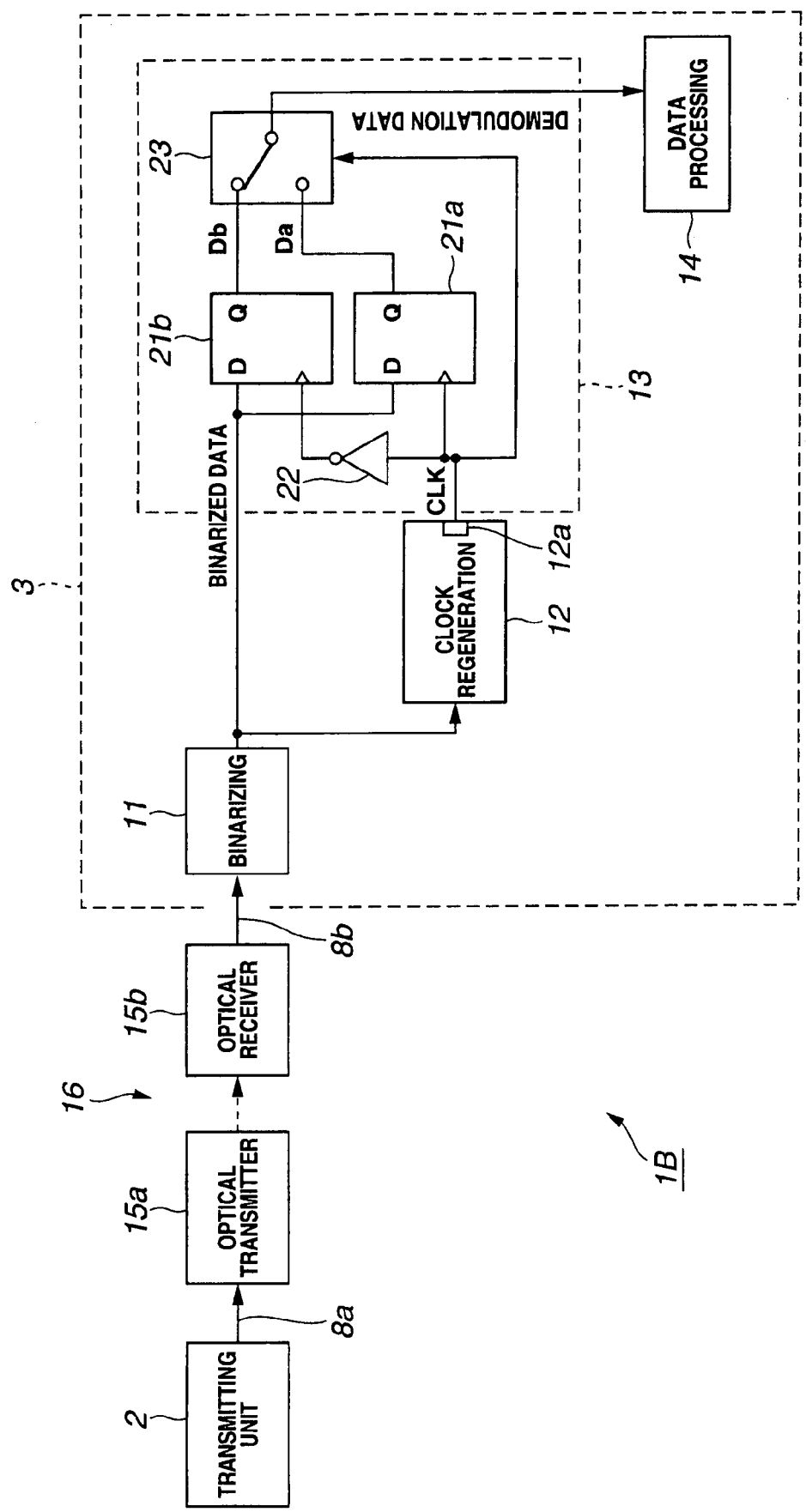
FIG. 5 is a block diagram illustrating a configuration of the signal transmitting system provided with an embodiment 2 of the present invention.

FIG. 5 is a block diagram illustrating a configuration of a signal transmitting system 1B provided with an embodiment 2 of the present invention. An object of the present embodiment is to provide the signal processing apparatus and the signal processing method in which the Manchester code is demodulated with the power consumption suppressed.

In the signal transmitting system 1B, an optical coupling unit 16 is adopted in place of the capacitive-coupling unit 4 of the signal transmitting system 1 of FIG. 1.

The optical coupling unit 16 is provided in, for example, a terminal side of the transmitting line 8a, and includes:

an optical transmitter 15a which is an electro-optical converter converting an electrical signal to an optical signal; and an optical receiver 15b which is an optical-electro converter receiving (light-receiving) the optical signal converted by the optical transmitter 15a to convert the received optical signal to the electrical signal.

The optical transmitter 15a transmits the optical signal corresponding to the modulation data, and the transmitted optical signal is converted to the modulation data, which is the electrical signal, by the optical receiver 15b.

The converted modulation data is formed to the binarized data by the binarizing circuit 11, and is later inputted to the clock regenerating circuit 12 and the demodulating circuit 13.

As also described in the embodiment 1, the demodulating circuit 13 executes the demodulating process (decoding process) with the signal processing unit corresponding to two pieces of the binarized data, and the configuration of the demodulating circuit 13 will be specifically described below.

The demodulating circuit 13 includes:
a D-type flip-flop (abbreviated as FF) 21a in which a regeneration clock CLK from the clock regenerating circuit 12 is applied to a clock input terminal; and
an FF 21b in which the regeneration clock CLK inverted by an inverter 22 is applied to the clock input terminal.

Meanwhile, in the present embodiment, the regeneration clock CLK, which is outputted from the clock regenerating circuit 12 to a side of the FF 21a and the FF 21b, is slightly delayed by a delay element 12a provided in the clock regenerating circuit 12, and is outputted.

The binarized data is applied to data input terminals D of both of the FF 21a and the FF 21b.

The demodulating circuit 13 includes:
a switch 23 in which data Da and Db outputted from output terminals Q of both of the FF 21a and the FF 21b respectively are inputted to be alternately switched by the regeneration clock CLK in each half cycle of the regeneration clock CLK.

The demodulation data is outputted from the switch 23.

Meanwhile, as described above, the regeneration clock CLK generated by the clock regenerating circuit 12 is a clock whose half cycle corresponds to the term of two pieces of the binarized data (or, modulation data).

A circuit element configured in the demodulating circuit 13 operates as substantially synchronized with the regeneration clock CLK, thus, the circuit element configured in the demodulating circuit 13 executed the demodulating process at a frequency of the regeneration clock CLK, that is, at a low frequency whose half cycle corresponds to the term of two pieces of the modulation data.

FIG. 6 is a timing diagram illustrating an operation of the demodulating circuit 13.

The binarized data illustrated in the uppermost part of FIG. 6 is generated by the binarizing circuit 11. Since the optical coupling unit 16 is used, even when the second bit and the first bit continue to be "11", a signal level of the generated binarized data is not lowered.

That is, even when any of the first bit and the second bit is detected, it does not become more possible to misdetect depending on a bit to be detected when the bit is binarized.

As illustrated in FIG. 6, the clock regenerating circuit 12 generates, with the binarized data, the regeneration clock which is phase-synchronized to the binarized data. Meanwhile, even in FIG. 6, information indicating the bit position is illustrated below the regeneration clock.

The regeneration clock CLK illustrated in FIG. 6 is generated by slightly delaying the regeneration clock with the delay element 12a.

The regeneration clock CLK is applied to the FF 21a configured in the demodulating circuit 13, and is inverted by an inverter 22 to be applied to the FF 21b. As illustrated in FIG. 6, the FF 21a loads the binarized data at a rising edge of the regeneration clock CLK, and outputs the data Da from the output terminal Q.

As illustrated in FIG. 6, the FF 21b loads the binarized data at a falling edge (the FF 21b itself operates at a rising edge of a signal applied to the clock input terminal like the FF 21a) of the regeneration clock CLK, and outputs the data Db from the output terminal Q.

The data Da and Db, which are outputs of both of the FF 21a and the FF 21b, pass through the switch 23 alternately switching the input signals in each signal processing cycle which is a half cycle of the regeneration clock CLK, and the demodulation data illustrated in FIG. 6 is generated.

In the present embodiment, substantially like the embodiment 1, the demodulation (decoding) process is executed as synchronized with the regeneration clock CLK whose frequency is low; therefore, the power consumption can be reduced.

Note that, the present embodiment has been described in such an operation example that only the second bit of the binarized data is detected like the case of the embodiment 1. In the present embodiment, even when the second bit and the first bit continue to be "11" in the Manchester-encoding, since the modulation data is transmitted through the optical coupling unit 16, the eye aperture is not degraded in such a case. Thus, the present embodiment is not limited to such a case that the second bit of the binarized data is detected.

That is, the present embodiment can be widely applied to such a case that only any one of the first bit and the second bit is detected.

Meanwhile, the demodulating circuit 13 illustrated in FIG. 5 can be also applied to the embodiment 1. The binarizing circuit 11 is not a requisite component.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A signal processing apparatus executing a decoding process for a digital signal Manchester-encoded by assigning two bits of "10" to any one of binary digital signals "0 and "1", and assigning two bits of "01" to the other binary digital signal, comprising:
    a decoding unit executing the decoding process with a processing unit corresponding to a term of two bits of the Manchester-encoded digital signal so as to detect only any one of a first bit and a second bit of the Manchester-encoded digital signal,
    wherein the decoding unit detects only the second bit of the Manchester-encoded digital signal at a falling edge or a rising edge of a clock switched by the first bit and the second bit of the Manchester-encoded digital signal.

2. The signal processing apparatus according to claim 1, further comprising:
    a binarizing circuit binarizing the Manchester-encoded digital signal to output the binarized Manchester-encoded digital signal to the decoding unit.

3. The signal processing apparatus according to claim 1, further comprising:
    a capacitive-coupling unit detecting the Manchester-encoded digital signal by utilizing a capacitive-coupling to output the Manchester-encoded digital signal detected by the capacitive-coupling to the decoding unit.

4. A signal processing apparatus executing a decoding process for a digital signal Manchester-encoded by assigning two bits of "10" to any one of binary digital signals "0 and "1", and assigning two bits of "01" to the other binary digital signal, comprising:
 a decoding unit executing the decoding process with a processing unit corresponding to a term of two bits of the Manchester-encoded digital signal so as to detect only any one of a first bit and a second bit of the Manchester-encoded digital signal,
 wherein the decoding unit executes the decoding process for the Manchester-encoded digital signal by using only a circuit element operating as substantially phase-synchronized with a switching timing of the first bit and the second bit of the Manchester-encoded digital signal.

5. The signal processing apparatus according to claim 4, further comprising:
 a binarizing circuit binarizing the Manchester-encoded digital signal to output the binarized Manchester-encoded digital signal to the decoding unit.

6. The signal processing apparatus according to claim 4, further comprising:
 a capacitive-coupling unit detecting the Manchester-encoded digital signal by utilizing a capacitive-coupling to output the Manchester-encoded digital signal detected by the capacitive-coupling to the decoding unit.

7. A signal processing apparatus executing a decoding process for a digital signal Manchester-encoded by assigning two bits of "10" to any one of binary digital signals "0 and "1", and assigning two bits of "01" to the other binary digital signal, comprising:
 a decoding unit executing the decoding process with a processing unit corresponding to a term of two bits of the Manchester-encoded digital signal so as to detect only any one of a first bit and a second bit of the Manchester-encoded digital signal;
 a clock generating circuit generating a clock synchronized with a phase of the Manchester-encoded digital signal from the corresponding Manchester-encoded digital signal; and
 a binarizing circuit binarizing the Manchester-encoded digital signal to output the binarized Manchester-encoded digital signal to the decoding unit and the clock generating circuit,
 wherein the decoding unit extracts only the second bit of the Manchester-encoded digital signal output from the binarizing circuit at the falling edge or the rising edge of the clock output from the clock generating circuit.

8. The signal processing apparatus according to claim 7, further comprising:
 a capacitive-coupling unit detecting the Manchester-encoded digital signal by utilizing a capacitive-coupling to output the Manchester-encoded digital signal detected by the capacitive-coupling to the decoding unit.

9. A signal transmitting system, comprising:
 a transmitting unit including a Manchester-encoding unit generating a digital signal Manchester-encoded by assigning two hits of "10" to any one of binary digital signals "0 and "1" of transmission data to be transmitted, and assigning two bits of "01" to the other binary digital signal; and
 a receiving unit including a decoding unit executing a decoding process for the Manchester-encoded digital signal with a processing unit corresponding to a term of two bits of the Manchester-encoded digital signal so as to detect only any one of a first bit and a second bit of the Manchester-encoded digital,
 wherein the decoding unit executes the decoding process for the Manchester-encoded digital signal by using only a circuit element operating as substantially phase-synchronized with a switching timing of the first bit and the second bit of the Manchester-encoded digital signal.

10. The signal transmitting system according to claim 9, wherein the transmitting unit includes:
 an optical transmitting unit transmitting, as an optical signal, the digital signal Manchester-encoded by the Manchester-encoding unit.

11. The signal transmitting system according to claim 9, wherein the transmitting unit includes:
 a transmitting electrode pad transmitting the digital signal Manchester-encoded by the Manchester-encoding unit by utilizing a capacitive-coupling.

12. The signal transmitting system according to claim 9, wherein the receiving unit includes:
 an optical receiving unit receiving the Manchester-encoded digital signal transmitted as the optical signal from the transmitting unit.

13. The signal transmitting system according to claim 9, wherein the receiving unit includes:
 a receiving electrode pad receiving the digital signal Manchester-encoded by the Manchester-encoding unit by utilizing the capacitive-coupling.

14. The signal transmitting system according to claim 9, wherein the receiving unit includes:
 a binarizing circuit binarizing the Manchester-encoded digital signal transmitted from the transmitting unit.

15. A signal processing method for a digital signal Manchester-encoded by assigning two bits of "10" to any one of binary digital signals "0 and "1", and assigning two bits of "01" to the other binary digital signal, comprising:
 a decoding step of executing a decoding process with a processing unit corresponding to a term of two bits of the Manchester-encoded digital signal so as to detect only any one of a first bit and a second bit of the Manchester-encoded digital signal; and
 a clock generating step of generating a clock phase-synchronized with the Manchester-encoded digital signal, wherein
 the decoding step extracts only the second bit of the Manchester-encoded digital signal at a falling edge or a rising edge of the clock generated by the clock generating step.

16. The signal processing method according to claim 15, further comprising:
 a binarizing step of executing a binarizing process for the Manchester-encoded digital signal before the decoding step executes the decoding process.

17. The signal processing method according to claim 15, wherein the binarizing step executes the binarizing process for the Manchester-encoded digital signal, the decoding step executes the decoding process for the binarized digital signal, and the clock generating step executes the clock-generating process for the binarized digital signal.

* * * * *